US008126760B2

(12) United States Patent
Kelly et al.

(10) Patent No.: US 8,126,760 B2
(45) Date of Patent: Feb. 28, 2012

(54) WORK ITEM TRACKING SYSTEM FOR PROJECTS

(75) Inventors: Kevin C. Kelly, Chapel Hill, NC (US); Sam Guckenheimer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1330 days.

(21) Appl. No.: 11/089,613

(22) Filed: Mar. 25, 2005

(65) Prior Publication Data

US 2006/0218028 A1 Sep. 28, 2006

(51) Int. Cl.
*G06Q 10/00* (2006.01)

(52) U.S. Cl. ............. 705/7.27; 705/7.11; 705/7.38; 717/102

(58) Field of Classification Search .......... 705/7, 8, 705/9, 10, 7.11
See application file for complete search history.

(56) References Cited

U.S. PATENT DOCUMENTS

| | | | | | |
|---|---|---|---|---|---|
| 5,473,773 | A | * | 12/1995 | Aman et al. | 718/104 |
| 5,675,739 | A | * | 10/1997 | Eilert et al. | 709/226 |
| 5,940,804 | A | * | 8/1999 | Turley et al. | 705/9 |
| 5,999,910 | A | * | 12/1999 | Rosenfeld et al. | 705/7 |
| 6,006,193 | A | * | 12/1999 | Gibson et al. | 705/8 |
| 6,009,405 | A | * | 12/1999 | Leymann et al. | 705/9 |
| 6,078,325 | A | * | 6/2000 | Jolissaint et al. | 715/839 |
| 6,381,640 | B1 | * | 4/2002 | Beck et al. | 709/223 |
| 6,434,568 | B1 | * | 8/2002 | Bowman-Amuah | 707/103 R |
| 6,434,628 | B1 | * | 8/2002 | Bowman-Amuah | 714/48 |
| 6,438,594 | B1 | * | 8/2002 | Bowman-Amuah | 709/225 |
| 6,442,748 | B1 | * | 8/2002 | Bowman-Amuah | 717/108 |
| 6,477,580 | B1 | * | 11/2002 | Bowman-Amuah | 709/231 |
| 6,477,665 | B1 | * | 11/2002 | Bowman-Amuah | 714/39 |
| 6,496,850 | B1 | * | 12/2002 | Bowman-Amuah | 709/203 |
| 6,502,213 | B1 | * | 12/2002 | Bowman-Amuah | 714/49 |
| 6,529,909 | B1 | * | 3/2003 | Bowman-Amuah | 707/10 |
| 6,529,948 | B1 | * | 3/2003 | Bowman-Amuah | 709/217 |
| 6,539,396 | B1 | * | 3/2003 | Bowman-Amuah | 707/103 R |
| 6,601,234 | B1 | * | 7/2003 | Bowman-Amuah | 717/108 |
| 6,985,872 | B2 | * | 1/2006 | Benbassat et al. | 705/8 |
| 7,289,964 | B1 | * | 10/2007 | Bowman-Amuah | 705/1 |
| 7,447,712 | B2 | * | 11/2008 | Beizer et al. | 1/1 |
| 7,516,438 | B1 | * | 4/2009 | Leonard et al. | 717/102 |
| 2002/0026297 | A1 | * | 2/2002 | Leymann et al. | 703/1 |
| 2002/0120493 | A1 | * | 8/2002 | Mormile | 705/11 |
| 2002/0198926 | A1 | * | 12/2002 | Panter et al. | 709/106 |
| 2003/0106039 | A1 | * | 6/2003 | Rosnow et al. | 717/100 |
| 2003/0135399 | A1 | * | 7/2003 | Ahamparam et al. | 705/7 |
| 2004/0138897 | A1 | * | 7/2004 | Eapen | 705/1 |

(Continued)

OTHER PUBLICATIONS

Kolisch, Rainer. (1999). Resource allocation capabilities of commercial project management software packages. Interfaces, 29(4), 19-31.*

(Continued)

*Primary Examiner* — Lynda Jasmin
*Assistant Examiner* — Gurkanwaljit Singh
(74) *Attorney, Agent, or Firm* — Wolf, Greenfield & Sacks, P.C.

(57) ABSTRACT

A work item tracking system that provides for processing of more than one type of work item. Work item types may be defined using a data structure. Fields and characteristics of the work item are defined within the work item type definition. Programs within the work item tracking system may use this information to create, modify and otherwise process work items of a single type or to form links between work items of different types.

18 Claims, 8 Drawing Sheets

U.S. PATENT DOCUMENTS

| | | | |
|---|---|---|---|
| 2004/0205657 A1* | 10/2004 | Kudo et al. | 715/530 |
| 2004/0230468 A1* | 11/2004 | King et al. | 705/10 |
| 2005/0027577 A1* | 2/2005 | Saeed | 705/8 |
| 2006/0173879 A1* | 8/2006 | MacFarlane et al. | 707/101 |
| 2007/0192415 A1* | 8/2007 | Pak | 709/206 |

OTHER PUBLICATIONS

Sou-Sen Leu, & Tzung-Heng Hung. (2002). An optimal construction resource leveling scheduling simulation model. Canadian Journal of Civil Engineering, 29(2), 267-275.*

"Aegis Service Desk—ITIL Based Service Management System," Abacus Systems, Jul. 25, 2005, pp. 1-5.

"Rational ClearCase," IBM Software—Rational ClearCase—Product Overview, Aug. 15, 2005, pp. 1-2.

"Rational ClearCase," IBM Software—Rational ClearCase—Features and benefits, Aug. 15, 2005, pp. 1-3.

"Census Bug Tracking Software and More," MetaQuest Software, Jul. 25, 2005, pp. 1-3.

"Serena PVCS—Tracker," Synergex products, Aug. 15, 2005, pp. 1-2.

"Serena PVCS—Tracker," Synergex factsheet, Aug. 15, 2005, pp. 1-3.

* cited by examiner

Project

| Work Item Name | State | Responsible |
|---|---|---|
| Bug 1 | Completed — 304 | Joe - Bug Group |
| Bug 2 | Not Completed | Cathy - Bug Group |
| Event 1 | Completed | Joe – Project Mgr. |
| Requirement 1 | Not Completed | Alex + Sally – Development Group |
| Task 1 | Completed | Mark - Test Group |

```
<WITD application="work item type editor" version="1.0">

<WORKITEMTYPE name="bug">

<DESCRIPTION>Bug work item types are used to track defects with the
code.</DESCRIPTION>

<GLOBALLISTS>
...
</GLOBALLISTS>

<FIELDS>   402

See FIG. 4a

</FIELDS>

<WORKFLOW>

See FIG. 4b

</WORKFLOW>

<FORM>

See FIG. 4c

</FORM>

</WORKITEMTYPE>

</WITD>
```

410

```
<FIELD refname="MyCorp.CusSeverity" name="Customer Severity"
type="String">

<HELPTEXT>Enter the severity of the problem</HELPTEXT>

<ALLOWEDVALUES>

<LISTITEM value="Emergency">
<LISTITEM value="Major">
<LISTITEM value="Minor">

</ALLOWEDVALUES>

<DEFAULT from="value" value="Minor"/>

</FIELD>
```

FIG. 4a

```
<STATES>
<STATE value="Active" />
<STATE value="Complete" />
</STATES>
<TRANSITIONS>
<TRANSITION from="Active" to="Complete">
    <REASONS>
        <REASON value="Deferred"/>
        <REASON value="No Plans to Fix"/>
    </REASONS>
</TRANSITION>
</TRANSITIONS>
```

FIG. 4b

```
<LAYOUT>
    <GROUP Label="1st Group">
        <COLUMN PercentWidth="70">
        ...
        </COLUMN>
        <COLUMN PercentWidth="30">
        ...
        </COLUMN>
    </GROUP>
</LAYOUT>
```

FIG. 4c

WORK ITEM TRACKING SYSTEM FOR PROJECTS

BACKGROUND OF INVENTION

1. Field of Invention

The invention is related to a system for tracking multiple types of work items.

2. Discussion of Related Art

Collaborative work environments are often used to track tasks and the progress that is made on tasks as work on the tasks progresses. A task may be a job that needs to be completed. Tasks may be represented on a computer system as task objects that provide for organization of data related to the tasks, e.g., a date a task is scheduled to be completed and/or the name of an individual to whom a task is assigned. A collaborative work environment is typically implemented on a computer system and is often used by several users to track tasks and data associated with the tasks.

Users may use a computer system to take actions related to a task object. For example, users may enter data into a computer system to update data associated with a task. A user may create a new task object to represent a task. In some circumstances, users may retrieve data related to the task.

Bug tracking systems are often used by software development teams to track bugs in a piece of software. A bug may be a problem with a piece of software that needs to be fixed. Bugs may be represented on a computer system as bug objects that provide for organization of data related to the bugs, e.g., problems that a bug is causing and/or the name of a customer that is affected by the bug. A bug tracking system is typically implemented on a computer system and is often used by several users to track bugs and data associated with the bugs.

Users may use a computer system to take actions related to a bug object. For example, users may enter data into a computer system to update data related to a bug. A user may create a new bug object to represent a bug. In some circumstances, users may retrieve data related to the bug.

Prior art work-related tracking systems have been used that track a single type of work-related element, e.g., tasks or bugs. These work-related tracking systems are separate systems. If a user wishes to track both tasks and bugs related to one project, then two different tracking systems are necessary.

SUMMARY OF INVENTION

In one aspect, the invention relates to a method of processing work items. Processing includes providing for a plurality of types of work items.

In another aspect, the invention relates to a data structure that defines a work item type. The data structure includes multiple elements, allowing the characteristics of work items of the defined work item type to be specified.

In another aspect, the invention relates to a method of processing work items in a computer system having computer data storage with computer data storage locations associated therewith. The method includes: providing a set of work item characteristics; creating a definition of a first type of work item, the definition comprising a first subset of the work item characteristics in the set; and creating in the computer storage media a data structure representing a work item from the definition.

In another aspect, the invention relates to a computer-readable medium having computer executable instructions for performing steps including: defining at least one work item of a first work item type comprised of a first set of work item characteristics; defining at least one work item of a second work item type comprised of a second set of work item characteristics, the second set being at least partially different from the first set; and processing, in one operation, work items of the first work item type and the second work item type.

In a further aspect, the invention relates to a computer-readable medium for use in connection with a system for processing work items, the computer-readable medium having stored thereon a data structure representing a work item type, a work item of the work item type being capable of being processed by the system for processing work items to take one of a set of states, the work item being capable of being displayed for a user on a human perceptible medium, the data structure including: a first data region containing data representing a definition of a field in the work item to contain data related to at least one characteristic of the work item; a second data region containing data defining information related to the set of states; and a third data region containing data defining information related to properties for displaying the work item on the human perceptible medium.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is a sketch showing a portion of a report including work items of different types;

FIG. 4a is a listing of sample code defining a work item field in the work item type definition of FIG. 4;

FIG. 4b is a listing of sample code defining work item states and state transitions in the work item type definition of FIG. 4;

FIG. 4c is a listing of sample code defining a work item form in the work item type definition.

DETAILED DESCRIPTION

Figure 1:
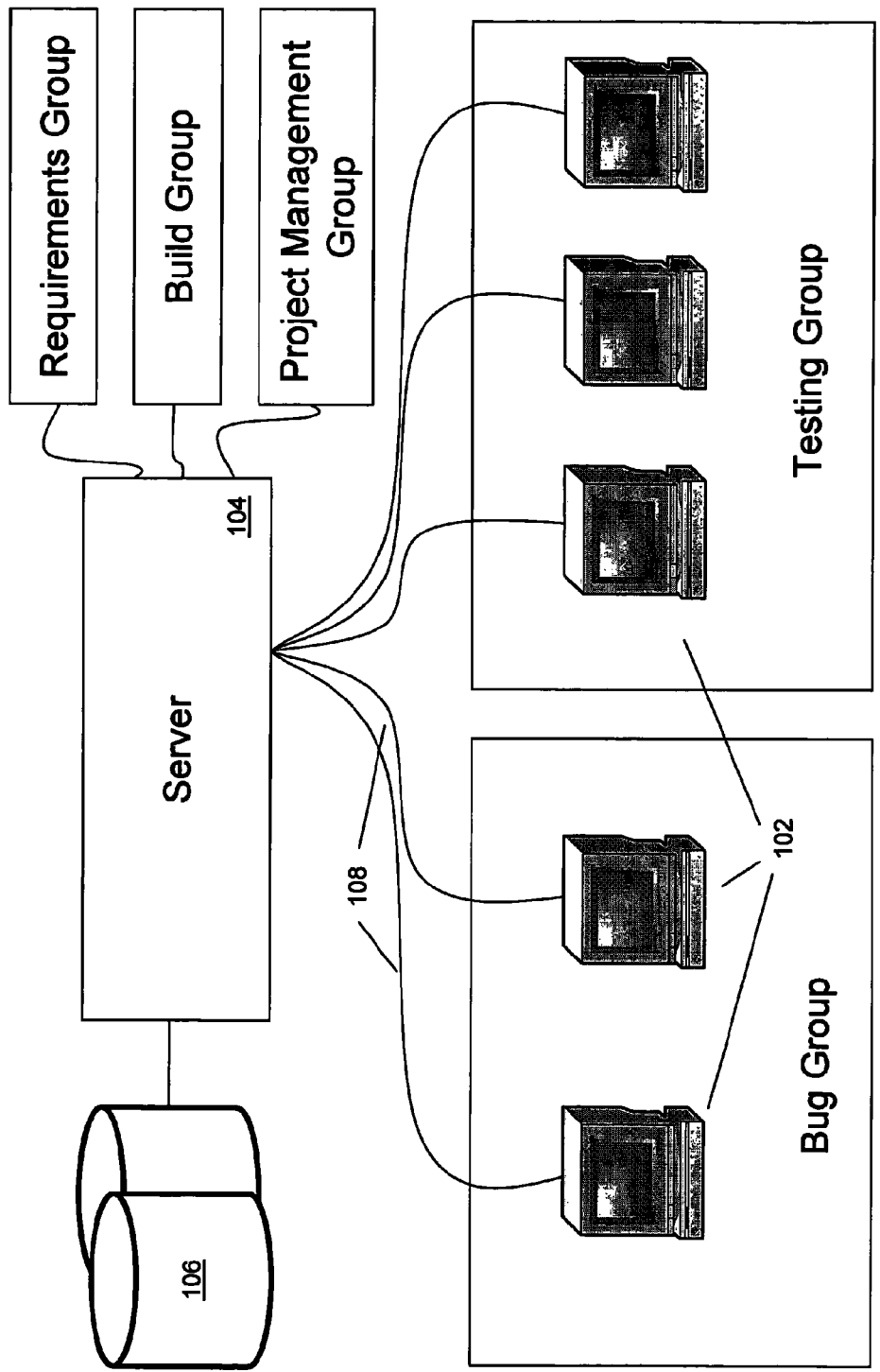
FIG. 1 is a diagram showing a computer system on which embodiments of the invention may be practiced.

A work item tracking system is presented that provides for tracking of more than one type of work item. The term "work item" refers generally to a collection of pieces of data relating to some action to be performed. The data may relate directly or indirectly to the action. The data in the work item may, for example, describe a task to be performed. In this example, the data may specify a name for the task, a party responsible for completing the task, the due date for the task, the status of the task or other information.

The data in a work item may relate indirectly to an action. The data in a work item may, for example, relate to something that may give rise to an action. For example, a work item in a work item tracking system used in the management of a software development project may identify a requirement that may be fulfilled by one or more coding tasks. As another example, the data in the work item may relate to a bug that will give rise to actions involved in correcting the bug. As another example, a work item may relate to an event observed during use of the software product after it has been deployed that may be caused by a bug, which may eventually be corrected by the performance of some action.

In the described embodiment, each work item is created as a record in a database. However, any suitable representation of a work item may be employed.

Work items may be of different work item types, each work item type having different kinds of data associated with it.

In the described embodiment, work item types may be defined using software tools. A work item may be an instance of a work item type which may also be created using software tools. Examples of work item types may include tasks that need to be performed, problems that need to be fixed, work-related events, and requirements.

The work item tracking system may provide for work items of different work item types to be processed together in one operation. A system that can track different kinds of work items may allow for work coordination within a project. For example, a software development project may track different kinds of work items such as bugs, tasks, requirements, and events in a single work item tracking system. As one example of processing work items in one operation, the work item tracking system can generate reports showing all the work items for which a specific individual or a specific group of individuals is responsible.

As another example of processing of work items of different types in one operation, different types of work items may be linked. For example, requirements may give rise to specific tasks to create specific pieces of software. Tests may verify compliance with certain requirements. Where a work item tracking system can process in one operation work items of types that represent requirements, tasks and tests, the work item tracking system may construct links between the work items of different types. The system may, for example, use links between work items representing requirements and work items representing tests to create a report showing all tests that must be run to verify performance of software prepared in response to a requirement.

FIG. 1 shows an exemplary computer system that may be used for work item tracking. A work item tracking system may be implemented on a server 104 that maintains a database 106. Client computers 102 may be used to communicate with the server to access the work items and/or process the work items.

Server 104 may be a device and/or software that is configured and arranged to send, receive and process data. Server 104 may be a hardware device configured and arranged to send and receive data via one or more network connections, but a server is not limited to a hardware device. Server 104 may be or include software configured and arranged to send, receive, or process data from one or more processes. Any suitable server may be used.

Server 104 typically includes at least some form of computer readable media. Computer readable media can be any available media that can be accessed by server 104. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by Server 104. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Server 104 may have encoded on a computer-readable medium associated with server 104 one or more programs that, when executed on one or more computers or other processors, perform methods that implement aspects of a work item tracking system. The term "program" is used herein in a generic sense to refer to any type of computer code or set of instructions that can be employed to program a computer or other processor to implement various aspects of the work item tracking system. Additionally, it should be appreciated that one or more computer programs need not reside on a single computer, server, or processor, but may be distributed in a modular fashion amongst a number of different computers, servers, or processors.

In the work item tracking system described herein, programs in server 104 manage the flow of information between database 106 and users using client computers 102. These programs may also infuse rules and automated processing of the work item tracking system. The programs may respond to user input by creating and/or modifying work item type definitions and/or work items. The programs may also respond by changing a state associated with a work item or taking other actions automatically.

Database 106 may store data structures representing specific work items. Any suitable database may be used. A database may be a device used to store data in any suitable way, e.g., on a computer readable medium as discussed above. Database 106 may include programs to organize for storage and retrieve data in the database.

The work item tracking system shown in FIG. 1 also includes a plurality of client computers 102. A client computer may be any suitable computer, e.g., a personal computer or a workstation. In some cases the client computer may provide for exchanging data with a user, and may include input and/or output devices such as a keyboard, a mouse, a printer or a display screen. The client computer may also include computer readable media, which may also store data and/or programs that perform in an automated or semi automated fashion steps in the process of exchanging information between the user and database 106.

Client computers 102 may be connected via network connections 108 to server 104. Client computers 102 may communicate with server 104 via the network connections 108 to send and receive data associated with various work items. Any suitable network connections may be used. For example, a LAN connection, a WAN connection, or a wireless connection may be used.

Server 104 may manage a database 106 on which is stored data related to work items to be tracked by server 104. The client computers 102 may be associated with individual users in one or more work groups, one or more projects and/or one or more teams. FIG. 1, for example, shows two client computers 102 associated with a software bug group and three client computers 102 associated with a software testing group. Other groups such as a requirements group, a build group, and a project management group, for example, may also have client computers associated with them that are connected to server 104. Any suitable number of groups may be clients of server 104, and each group may have any suitable number of client computers 102.

In operation, a user may enter data at a client computer 102 related to a work item. For example, a manager in the bug group may enter data that represents the date by which a particular software bug needs to be fixed. Once the data is entered, the client computer 102 may electronically send a signal that represents the date to server 104. Once the server 104 receives the signal, the server 104 may store data representative of the date in the database 106 in a format that associates the data with a specific work item. Other users, processes, or client computers may gain access to the data associated with the bug work item by communicating with server 104. For example, users in the bug group who are assigned to fix the bug may wish to know the date by which the work needs to be completed. In another example, users in the testing group may wish know the date on which the work item is scheduled to be completed so that they may plan to test the software after the bug is fixed. To access this work item information the users may use the client computers 102 to communicate with server 104 as discussed above.

Figure 2:
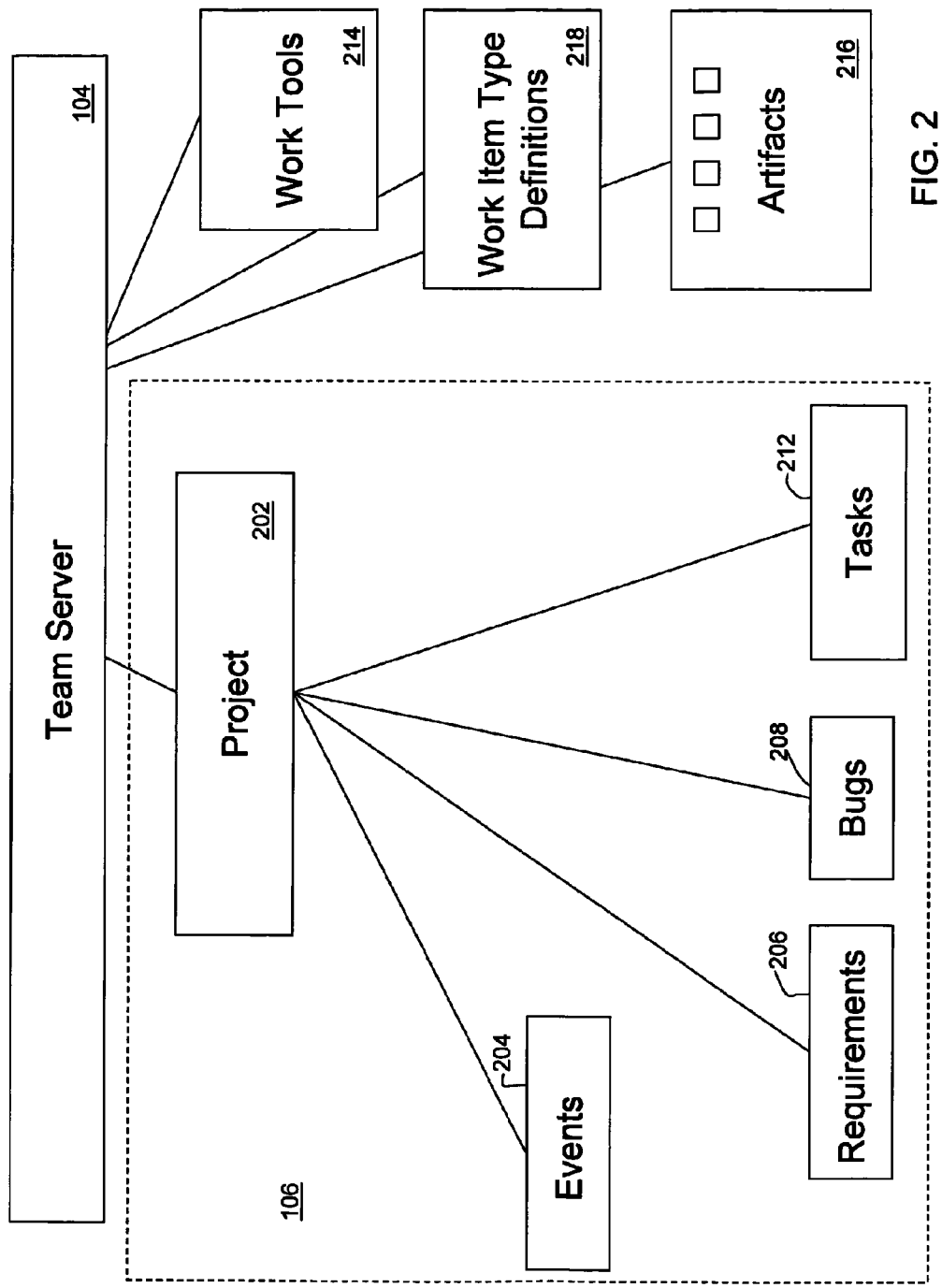
FIG. 2 is a diagram showing an organization of elements of a work item tracking system.

FIG. 2 shows one possible organization of elements of a work item tracking system. Server 104 may maintain one or more projects associated with groups of related work. In FIG. 2, only one project 202 is shown for clarity. A project may have associated with it a plurality of work items of multiple work item types. FIG. 2 shows project 202 having several work items of different work item types: events 204, requirements 206, bugs 208, and tasks 212. Work items and project data may be stored in the database 106 maintained by server 104.

A plurality of tools 214 may have access to the various work items and/or project data via server 104 for processing work items. Tools 214 may be used to process work items, for example, to prepare a report. Tools 214 may be implemented as programs resident on server 104, on client computers 102 or on any other suitable computer. The tools 214 may be developed using any programming techniques now known or hereafter developed to process the work items as required. Each of the tools 214 may process work items of a single type or may process work items of multiple types. Processing may include creating, updating, deleting, sorting, grouping or performing any other desired operation. In addition, tools 214 may include tools, such as a text editor, to create work item type definitions.

Work items may be viewed and edited from multiple software clients, such as a purpose-built client operating under the WINDOWS® operating system, a web-hosted client, MICROSOFT® Project team management software, MICROSOFT® Excel spread sheet, or MICROSOFT® Word word processor, and any other suitable tools. Other systems, such as source control, test management, requirements management, and build automation, may interface to database 106 for creating, editing, and updating work items.

Changes to work items can generate events for other systems. For example, an email service may monitor changes to work items and send email or schedule updates to certain users based on changes to work items of interest. A build system or reporting system might generate builds and reports based on updates to other work items.

The data of a work item may track the state of completion of an action, any sequence of progress through any series of states, and changes made with each edit of the work item. This series may provide a basis for reporting and auditing the history of actions, such as required by the statutes and regulations such as the Sarbanes-Oxley act, or regulations established by the FDA, the SEC, the FAA, and other regulatory agencies. Such reporting and auditing may be performed through the use any suitable tool, as discussed above.

As an example of the processing of work items of multiple work item types, FIG. 3 shows a portion of a report including work items of different work item types. In this embodiment, several work items are listed that may be related to a project, e.g., a project to update a particular version of a type of software. In this particular embodiment, the project has two bug work items, an event work item, a requirement work item, and a task work item associated with the project.

Processing work items of different work item types together in one operation may allow for coordination of work. The portion of a report shown in FIG. 3 is one example of processing work items of different work item types in one operation. In this embodiment, work items of different work item types are processed in one operation to generate the report. There are many different ways that work items may be processed in one operation. As another example, a calendar tool may search through a group of work items of different types to find dates on which the work items need to be completed and display the dates as part of a visual representation on a calendar.

A work item may have one or more fields which may contain field data related to an attribute of the work item. A field may contain any suitable type of data, e.g., integers, doubles, strings, characters, etc. In the embodiment shown in FIG. 3, each work item has two fields associated with each work item: "work item name" 302 and "responsible" 306. The "work item name" field may contain data representing the name of the work item, e.g., "Bug 1". The "responsible" field may contain data representing the name of an individual and/or group that is responsible for the work item, e.g., "Joe—Bug Group." Any suitable number and/or types of fields may be chosen for a work item type. Some work items types may provide for a greater or lesser number of fields than other work item types. Some work item types may provide for different types of fields than other work item types.

Artifacts 216 may be elements that are related to work items, e.g., source code files, documentation, or software library definitions. Work items and/or project data may be linked to artifacts 216. Linking work items and/or project data to artifacts (and vice versa) may facilitate finding information. For example, a bug work item may be linked to the source code file in which the bug may be located, making it easier to find the source code file than if the file were searched for manually.

The work item tracking system may include work item type definitions 218. Work item type definitions 218 may be associated with project 202, such that each work item type definition is available for creating or processing work items in project 202. However, work item type definitions may have a narrower scope, such as being applicable for creating or processing work items in a work group, or may have a broader scope, such as for creating or processing work items in any project of the work item tracking system.

Each work item type definition 218 may be implemented as a data structure on a computer readable medium. The physical location of the computer readable medium is not important to the invention. It may, for example, be on the same physical storage device as database 106, in computer data storage associated with server 104 or in any other suitable location. In the described embodiment, each work item type definition is stored as a text file containing XML statements. However, any suitable representation of a work item type may be used.

A work item type definition may include one or more elements. The elements may define various characteristics of work items of the work item type. For example, one element may contain subelements that define data fields in each work item of the work item type. The subelements may include definitions of allowed values or other attributes for the field.

Work item fields may have associated work item field rules that define under which circumstances field data may be entered, changed, and/or read. For example, work item field rules may be implemented to prevent an unauthorized user from changing the "responsible" field from one individual to another individual.

An element may also provide state information relating to work items of the work item type. State information may, for example, define allowed states for the work item and other information relating to the state, such as rules that define the conditions under which the state can change or conditions under which the state of the work item should automatically change.

The element defining state information may include subelements specifying rules for state transitions that may take place for work items of that type. One state transition rule, for example, may list which persons and/or processes are allowed to make a state change. As another example, a state transition rule may prevent a user from changing a work item state from "not completed" to "completed" until certain criteria are met, e.g., a manager signing off on the quality of a work product.

A work item state may be regarded as a data field, with a value representing the status of the action to which the work item relates. In some work item types, the work item state may represent a certain point in the lifecycle of the work item. A work item may have any number of possible states. Referring again to FIG. 3, in this embodiment each work item has two allowed states: the states representing whether the work item has been completed. For example, the state 304 of Bug 1 is "completed" but the state of Bug 2 is "not completed." Each work item may also have a set of allowed state transitions rules related to state transitions.

The work item type definition may capture the permissible and intended workflow associated with the work item type as work item states. For example, a requirement work item may go through states such as Proposed, Accepted, Allocated, Implemented, and Validated in certain software lifecycle processes such as the CMMI® of the Software Engineering Institute. These phases, or any others, may be captured as states and transitions in the definition of the requirement work item type, or any other work item type. Each state and transition may have business rules associated with it that determine which roles have permission to perform the transition under which circumstances.

The discrete capture of a workflow model for work items allows fine-grained metrics to be gathered for use in a data warehouse or reporting system. Rates of progression of tasks, requirements implementation, or any other work item transitions may be captured for analysis and reporting.

In some embodiments, a work item tracking system may allow for automatic or semiautomatic actions to be taken with respect to work items. The rules associated with state transitions may be used for automated processing. Such rules may specify when a transition should occur or should not occur. The automatic actions may be the result of executing programming in the tools 214. Alternatively, the automatic actions may be the result of execution of programs in client computers 102 or server 104. For example, the programs associated with server 104 may run each time a work item is created or modified to check the data stored in the data item against a set of rules.

Work items may be updated automatically based on asynchronous events received from other systems. For example, a build automation system may update a bug work item with a value for the "fixed in build" field or it might generate a task to investigate a failed build. A build automation system is discussed further in pending U.S. application Ser. No. 11/085, 346, titled "Automated Process For Generating a Build of a Software Application Without Human Intervention" by Douglas T. Neumann et. al., filed on Mar. 21, 2005, which is hereby incorporated herein by reference in its entirety. A test management system might generate bug work items based on test failures. Updates made in a scheduling system such as MICROSOFT® Project can update date and dependency fields in corresponding work items.

In addition to rules related to state transitions, the work item type definition may include rules related to data fields. The set of rules may, for example, specify the range of allowed values for a field in work items of the work item type being processed. The rules may also specify actions to be taken when a field in the work item has a certain value.

For example, a work item may be automatically changed in response to a change in a work item of a different type. The server may be configured to automatically report work item data to a person responsible for the work item. For example, in FIG. 3, Sally and Alex may both be responsible for "Requirement 1." If Sally completes "Requirement 1," server may report to Alex that the "Requirement 1" has been completed. Reporting may be accomplished in any suitable way, through any suitable interface e.g., by sending an e-mail to Alex indicating that "Requirement 1" has been completed. Reporting may include sending data related to a field in a work item, indicating that a state change has occurred and/or indicating the state of a work item. In another example, the server may report the state change representing the completion of "Requirement 1" to every individual associated with the project so that appropriate action may be taken.

In another example, a server may automatically update information associated with one work item in response to a change in information of a related work item of a different work item type. The server may be configured to take appropriate action in response to a change in a work item. For example, once a bug in a piece of software code has been fixed the code may need to be tested to make sure that the software still functions correctly. In response to a change of state of a bug work item from "not completed" to "completed" the server may take appropriate action to a task work item that represents a task of testing the software. Appropriate action may include processing, in one operation, related work items of different work item types to change data associated with fields in a work item and/or change the state of a work item. For example, the server may change a state of the testing task work item from "inactive" to "active" in response to the software being ready for testing. Appropriate action may include creating a new event work item that represents a meeting between individuals in the bug group and the software development group to discuss the source of the bug. Appropriate action may include sending data to one or more tools, e.g., a spreadsheet to update a cell containing a number of bugs that the bug team has fixed in a given period. Any suitable action may be taken automatically by the server such as updating work item data fields, changing work item states, creating work items, deleting work items, generating a report and/or sending data to tools. Further elements in a work item type definition may provide other definitions of the behavior and/or properties of the work items of the work item type. As another example, an element may define a form for display of work items of the work item type whenever a tool produces an output including a work item of the work item type. The form element may, for example, indicate the form of output, such as a desired appearance of data in data fields when presented for a human user on a computer display. The form information may specify such things as the amount of space on the display to allocate for data in selected data fields, the location on the display screen of data from selected data fields, highlighting to provide for the data as it is presented. Other complex formatting may be provided, such as specifying a display object to link with a particular data field. As one example, the form element may specify that input provided by a user in a particular text box is to be entered into a particular data field. The form element may include subelements that specify an input or output format for different contexts.

In the illustrated embodiment, the work item type definition is created in an XML file. That file includes a form element, with subelements. The types of subelements are specified by tags that the work item tracking system can process. The subelements include specifications of attributes that represent the types of input/output formatting the work item tracking system can process.

In the described embodiment, the work item tracking system may include predefined work item type definitions. For a work item tracking system used as a software development project management system, predefined types may include work items such as tasks and bugs.

In addition, the work item tracking system may include a schema, allowing for the creation of further work item types. The schema includes multiple elements that may be incorporated into a definition of a work item type to create a custom work item type. Custom work item types may allow for a high degree of flexibility and/or specificity in a work item tracking system. Custom work item types may be defined in any suitable manner.

Figure 4:
FIG. 4 is a listing of sample code that illustrates a work item type definition.

In the illustrated embodiment, custom work item type definitions are created as XML files, which may be created using a text editor or in another suitable manner. FIG. 4 shows a skeleton of a data structure defined in XML that may be used for representing a custom work item type.

In the example of FIG. 4, the custom work item type includes a preamble portion 410 that provides information about the work item type. In this example, preamble portion 410 names the work item type as a "bug" work item type. It also provides a description of the work item type, indicating that it may be used to track defects in code, which may be displayed to provide context sensitive help by tools processing the work item type.

An XML document typically contains a plurality of tags such as tag 402 that may be used to delimit elements in the code. For example, the <FIELDS> tag may delimit the beginning of a definition of one or more data fields and the </FIELDS> tag may delimit the end of the definition(s) of the data fields.

The custom work item type may have associated with it one or more subelements representing field definitions which are constructed and arranged to contain data representing a characteristic of the work item type. FIG. 4a shows an example section of XML code that may be used to define a field in a custom work item type. The field element 402 (FIG. 4) may have associated with it multiple subelements defining multiple data fields.

FIG. 4a provides an example of characteristics of a field that may be defined. In this example, defined characteristics include a name, help text that may be displayed for a user in any form that requests a value of the field be input by a user, a specification of allowed values for the field and a default value. In this example, the name of the field is "Customer Severity" and may represent the severity of a problem that a customer is facing with a particular bug represented by a bug work item with which the "Customer Severity" field is associated. In this example, the field may have one of three values: "Emergency," "Major," or "Minor" and the default value is "Minor."

The schema may include other characteristics that may be specified for the field. It may, for example, include the ability to specify conditions under which the value of a data field may change or will change. As another example, it may include conditions under which a change of the value in a data field is to cause a change to another work item or type of work item. Where the schema includes the ability to specify such characteristics, each subelement specifying a field may include constructs that specify the specific characteristics application to each data field.

Returning to FIG. 4, it can be seen that the work item type definition includes a workflow element. A work item may have associated with it state information that is altered as the actions associated with it, or other work items, are identified, taken, scheduled or otherwise processed. The state of each work item may be implemented as a field in the data structure defining the work item. As the work item and others in the system are processed, the current state of the work item may be changed by software, such as in the tools 214 or within server 204.

In the illustrated embodiment, information used for processing that may impact any part of the state may be specified in the workflow element, as pictured in FIG. 4b.

A work item type definition may have associated with it one or more state definitions that define the allowed states that a work item may have. A work item type definition may have associated with it one or more transition rules defining under what circumstances transitions are allowed to take place. FIG. 4b shows an example section of XML code that may be used to define a set of allowed work item states and allowed work item state transitions. In this example, the work item state may be either "Active" or "Complete." FIG. 4b also shows the definition of an allowable transition from "Active" to "Complete." In this example, the transition may be made because of two reasons ("Deferred" or "No Plans to Fix").

The example of FIG. 4b shows a rule for an allowed transition. Each work item type may have multiple transitions. In addition, the transitions may define both conditions under which a transition is permissible and conditions under which a transition should occur automatically. Accordingly, there may be multiple subelements defining transitions within the workflow element.

Providing a simple mechanism, such as is illustrated in FIG. 4, to define fields and characteristics of work items allows custom work item types to be created to provide processing as desired to implement the work item tracking system. It is not, however, necessary that every field or characteristic of a work item type be defined. The type definition provides information for programs implementing the work item tracking system needed to perform operations relating to work items, such as allocating memory to store data for each work item in computer memory, displaying the data stored in the work item or otherwise processing the work item.

It is not necessary that all fields and characteristics of a work item type be expressly defined. The work item processing system could, for example, be programmed to treat each work item of a type as if it had a certain field or characteristic, whether or not expressly defined.

Returning again to FIG. 4, it can be seen that the work item type definition includes a form element. A work item may be displayed for a user on a human perceptible medium, e.g., a computer monitor. The form element may include layout information related to properties for displaying work items of the work item type on the human perceptible medium for a user. The form element may include information related to how fields and values are displayed, e.g., the size of a field, the placement of a field in relation to other fields, etc.

FIG. 4c shows an example section of XML code that may be used to define information related to properties for displaying the work item on a human perceptible medium. When displayed, properties may be displayed in one or more groups which may be divided into one or more columns. In this example, a group element labeled "1st group" has two columns associated with it. When properties are displayed for the user, the group may be divided into two columns, e.g., a first column having a width of 70% of the width of the group and a second column having a width of 30% of the width of the group. When a work item is displayed, a field may be displayed with properties related to data defined in the column and/or group elements, e.g., with a certain width based on the width of the column with which the field may be associated. Any suitable arrangement of columns and/or groups may be used. The width of a column need not necessarily be defined.

Figure 5:
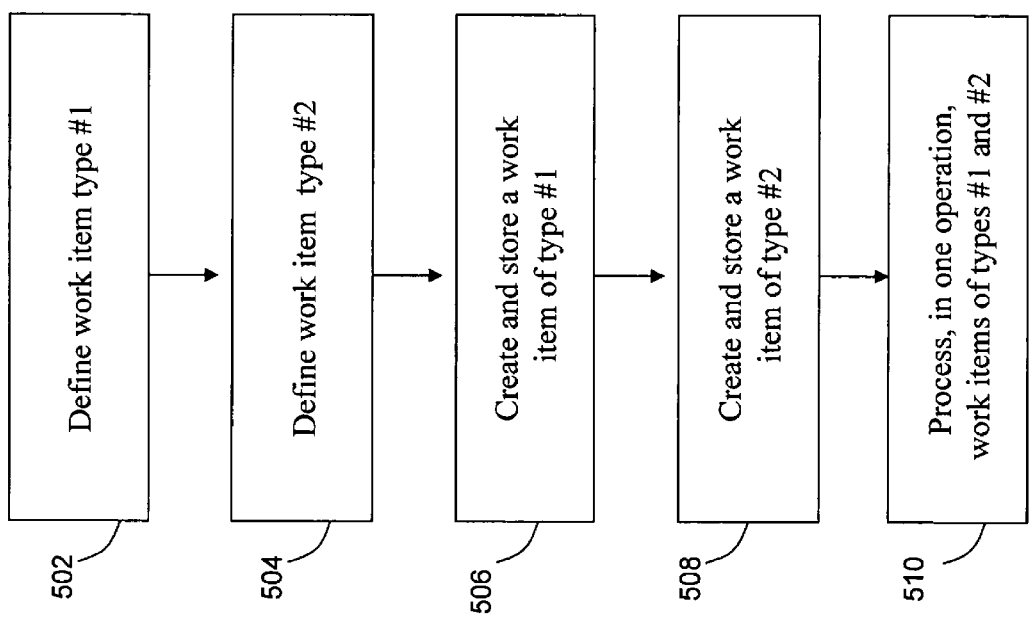
FIG. 5 is a flowchart illustrating a method of processing work items of different work item types.

FIG. 5 shows a flowchart of a method that may be used for processing related work items of different custom work item types. In step 502, work item type #1 is defined. In step 504, work type #2 is defined. Custom work item types may be defined by any suitable person or entity, e.g., a user of the work item tracking system or a third party programmer of custom work item types. Custom work item types may be defined in any suitable language, e.g., XML, and using any suitable tool, e.g., a text editor that creates a file in computer memory, such as is illustrated by work item type definitions 218.

In step 506, a work item of type #1 is created and stored in the database. A work item may be created in response to commands generated by other tools or software implementing work item tracking system. For example, a user interacting with the work item tracking system through a client computer 102 may invoke a tool 214 that accepts a bug report and produces a work item of the type "bug". Alternatively, software on server 104 may create a work item of a type indicating tests are to be performed automatically when a task requiring the generation of software changes its state to "completed."

Regardless of the specific event triggering the need to create a new work item, a work item may be created by allocating space in database 106. The space allocated in database 106 may be considered an instantiation of a work item type. The information specified in connection with the work item type definition indicates the amount of space needed to store the data associated with the fields in the work item.

In step 508, a work item of type #2 is created in a similar fashion and stored in the database.

Once the work items are defined and stored, the work items may be processed together in one operation in step 510, e.g., by the programs on server 104 or tools 214. Processing in one operation may involve generating an output that involves data from work items of multiple types such as is illustrated in FIG. 3. Alternatively, processing in one operation may involve any operation in which the processing affects work items of multiple types or the output depends on data in work items of multiple types.

For example, one way in which work items of different types may be processed together in one operation is by creating links between work items of different types. The links may, for example, allow the identification of tasks that need to be performed in response to a specific requirement and the output of the operation may be a report listing those tasks. Such associations between work items may extend throughout the life cycle of the project being managed with the work item tracking system. In the example of FIG. 2, database 106 includes work items representing requirements 206, which may occur at the early phases of a project. The requirements may give rise to tasks which occur at a later phase. Once the product is developed, bugs may be identified, giving rise to a further type of work item. Subsequently, events during product operation may give rise to even further types of work items. By being able to link different types of work items, actions needed at various stages in the lifecycle of a product development may be correlated.

Tools 214 able to process multiple types of work items in one operation may produce useful information that facilitates project management. As one example, events in connection with the operation of a fielded product may be processed through a tool 214 that processes multiple types of work items in database 106 linked to requirements for the product. Data associated with the requirements type of work item may identify specific individuals who created those requirements. With this information, a tool 214 may associate the person creating a requirement at one stage in a project lifecycle with events at a much later stage in the project lifecycle. Accordingly, many types of synergy are possible when work items of different types may be processed in one operation.

Work items of different types may be stored together in the same memory or they may be stored in different memories. A work item type definition may be stored in a different location from a work item of the work item type. Information related to work items and work item type definitions may be stored in any suitable location for the server to access the information. A work item and/or work item type definition may be stored in one location for a portion of its lifecycle and in another location for another portion of its lifecycle.

In the same way, processes that process the work items and work item types may run on any suitable processor, e.g., a computer, a server, etc. A process may use information related to work items and/or work item type definitions that is stored in more than one location. The location of the data and the nature of the processing may change over the lifecycle of a work item.

Having thus described several aspects of at least one embodiment of this invention, it is to be appreciated various alterations, modifications, and improvements will readily occur to those skilled in the art.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment. The specific order in which operations are performed is not critical to the invention.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Such alterations, modifications, and improvements are intended to be part of this disclosure, and are intended to be within the spirit and scope of the invention. Accordingly, the foregoing description and drawings are by way of example only.

What is claimed is:

1. A method of operating a computer system comprising at least a processor and memory to process work items, the computer system having computer storage media in the memory with computer data storage locations associated therewith, the method comprising:
providing a set of work item characteristics for the work items processed by the processor, the set of work item characteristics comprises state characteristics;
with the at least one processor, creating in the memory a definition of a first type of work item, the definition of the first type of work item comprising:
a first at least one element configured to define a first subset of the work item characteristics, the first at least one element comprising first state information, the first state information comprising:
a first plurality of values of a state characteristic of work items of the first type; and
first transition rules for state transitions between states of a lifecycle of a work item of the first type indicated by the first plurality of values of the first type of work item, the first transition rules for state transitions comprising:
a first state transition rule identifying at least one condition under which a state of the work item of the first type is allowed to change to another state, and
a second state transition rule identifying at least one source that is allowed to change the state of the work item of the first type to the another state;
creating in the computer storage media a first data structure representing a first work item of the first type from the created definition of the first type of work item, wherein the first data structure representing the first work item comprises information on at least one state of the first work item;
with the at least one processor, creating in the memory a definition of a second type of work item that is different from the definition of the first type of work item, the definition of the second type of work item comprising:
a second at least one element configured to define a second subset of the work item characteristics, the second at least one element comprising second state information, the second state information comprising:
a second plurality of values of a state characteristic of work items of the second type; and
second transition rules for state transitions between states of a lifecycle of a work item of the second type indicated by the second plurality of values of the second type of work item, the second transition rules for state transitions comprising:
a third state transition rule identifying at least one condition under which a state of the work item of the second type is allowed to change to another state, and
a fourth state transition rule identifying at least one source that is allowed to change the state of the work item of the second type to the another state; and
creating in the computer storage media a second data structure representing a second work item of the second type from the created definition of the second type of work item;
tracking the first work item of the first type and the second work item of the second type in a project, where the project comprises a plurality of operations; and
processing by the processor, in one operation of the plurality of operations, the first work item and the second work item, wherein the processing of the first work item and the second work item in one operation comprises linking the first work item to the second work item, wherein:
when the first work item of the first type represents a requirement and the second work item of the second type represents at least one test, the processing of the first work item and the second work item in one operation comprises generating a report indicating the at least one test to be performed to test performance of software in response to the requirement.

2. The method of claim 1, wherein:
the set of work item characteristics comprises a set of fields that may be included in a work item;
creating the definition of a first type of work item comprises:
creating a first subset of fields in the set of work item characteristics; and
defining state and state transition workflow data associated with the first work item as first work item states; and
creating the definition of a second type of work item comprises:
creating a second subset of fields in the set of work item characteristics; and
defining state and state transition workflow data associated with the second work item as second work item states.

3. The method of claim 2, wherein creating the definition of a first type of work item comprises specifying format information for an input/output operation associated with at least one field in the first subset of fields, and wherein creating the definition of a second type of work item comprises specifying format information for an input/output operation associated with at least one field in the second subset of fields.

4. The method of claim 2, wherein creating in the computer storage media a first data structure comprises creating a data structure with computer data storage locations associated with fields in the definition of the first type of work item, and wherein creating in the computer storage media a second data structure comprises creating a data structure with computer data storage locations associated with fields in the definition of the second type of work item.

5. The method of claim 1, wherein creating the definition of a first type of work item comprises defining a first set of work item states from the plurality of values of the state characteristic of work items of the first type and creating the definition of a second type of work item comprises defining a second set of work item states from the plurality of values of the state characteristic of work items of the second type.

6. The method of claim 1, wherein:
creating a first data structure in the computer storage media comprises storing in a computer data storage location a value indicative of one of the first plurality of states; and
creating a second data structure in the computer storage media comprises storing in a computer data storage location a value indicative of one of the second plurality of states.

7. The method of claim 1, wherein the first type of work item is related to observing a product for debugging a bug in software of the project and the second type of work item is related to testing the software.

8. The method of claim 1,
a) wherein creating the definition of a first type of work item comprises storing a representation of the definition of the first type of work item in a second computer storage media;
b) wherein creating the definition of a second type of work item comprises storing a representation of the definition of the second type of work item in the second computer storage media; and
(c) the method further comprises:
i) reading at least a portion of the representation of the definition of a type of work item from the second computer storage media;
ii) computing a value based in part on the portion of the representation; and
iii) writing the computed value to the data structure in the computer storage media.

9. A computer-readable storage medium having stored thereon computer executable instructions that when executed by a processor perform steps comprising:
receiving first user input defining, in accordance with a previously defined XML schema comprising a plurality of elements for creating work item type definitions, a first work item type comprised of a first set of work item characteristics and creating a first work item type definition based on the received first user input;
receiving second user input defining, in accordance with the XML schema, a second work item type comprised of a second set of work item characteristics, the second set being at least partially different from the first set and creating a second work item type definition based on the received second user input;
creating work items of the first type in response to user input, the work items of the first type being created in accordance with the first work item type definition;
creating work items of the second type in response to user input, the work items of the second type being created in accordance with the second work item type definition;
tracking the work items of the first work item type and the work items of the second work item type in a project, where the project comprises a plurality of operations; and
processing by the processor, in one operation of the plurality of operations, the work items of the first work item type and the work items of the second work item type, wherein the processing of the work items of the first work item type and the work items of the second work item type in one operation comprises generating an output that comprises data from the first work item type and the second work item type, wherein:
when a first work item from the work items of the first work item type is generated for a first user and a second work item from the work items of the second work item type is generated for the first user, the processing of the work items of the first work item type and the work items of the second work item type in one operation comprises generating a report indicating the first work item and the second work item are generated for the same user, and
defining the first work item type in accordance with the XML schema comprises:
defining the first set of the work item characteristics; and
providing first state information related to transition rules for state transitions of the first type of work item, wherein the first state information tracks a progress of transition of the first type of work item through the state transitions of the first type of work item; and
wherein defining the second work item type in accordance with the XML schema comprises:
defining the second set of the work item characteristics; and providing second state information related to transition rules for state transitions of the second type of work item, wherein the second state information tracks a progress of transition of the second type of work item through the state transitions of the second type of work item.

10. The computer-readable storage medium of claim 9, wherein the computer executable instructions when executed by the processor further perform steps comprising:
    associating a first set of work item data with a first set of fields comprising the first set of work item characteristics; and
    associating a second set of work item data with a second set of fields comprising the second set of work item characteristics.

11. The computer-readable storage medium of claim 10 wherein the processing, in one operation, comprises automatically changing work item data in the first set of work item data in response to a change in the second set of work item data.

12. The computer-readable storage medium of claim 10, wherein the processing, in one operation, comprises reporting the output to a user in response to receiving user data.

13. The computer-readable storage medium of claim 9, wherein the processing, in one operation, comprises linking at least one work item of the first work item type to at least one work item of the second work item type.

14. The computer-readable storage medium of claim 9, wherein the processing, in one operation, comprises linking a work item to a work item data file associated with the work item.

15. A computer-readable storage medium for use in connection with a system for processing work items by a processor, the computer-readable storage medium having stored thereon:
    a data structure representing a definition of work items of a type in accordance with a previously defined XML schema, wherein a work item of the type created using the definition is capable of being processed by the processor of the system for processing work items to take one a state of a set of states, the work item being capable of being displayed for a user on a human perceptible medium, the data structure comprising:
    (a) a first data region containing data representing a definition of a field of a plurality of fields in the work item to contain data related to at least one characteristic of the work item;
    (b) a second data region containing data defining information related to a plurality states of the work items of the type and transition rules for state transitions between states of the plurality of states, wherein the plurality of states define a workflow associated with the type, and each states of the plurality of states represents a point in a lifecycle of the work items of the type;
    (c) a third data region containing information related to properties for displaying the work item on the human perceptible medium, wherein the information related to properties for displaying the work item comprises a description of a visual representation of the work item on the human perceptible medium;
    at least one work item of the type created based on the definition of work items of the type, wherein the at least one work item of the type and at least one work item of another type are tracked in a project that comprises a plurality of operations; and
    an output of processing, in one operation of the plurality of operations the at least one work item of the type and the at least one work item of another type, wherein the output comprises data from the at least one work item of the type and the at least one work item of another type, wherein:
        when the at least one work item of the type represents a task related to software and the at least one work item of another type represents a task of testing the software, the processing in one operation of the at least one work item of the type and the at least one work item of another type comprises changing a state of the at least one work item of another type in response to a change of a state of the at least one work item of the type indicating that the software is prepared for testing; and
    computer executable instructions that, when executed, implement a tool for processing work items by accessing the data structure.

16. The data structure of claim 15, further comprising:
    a data region containing data defining information related to state transition rules for transitions between the plurality of states of the work item.

17. The data structure of claim 15, wherein the at least one characteristic of the work item comprises an affiliation with a group of work items, at least one work item in the group being of a different work item type.

18. The data structure of claim 15, wherein the at least one characteristic of the work item comprises a link to at least one work item of a different work item type.

* * * * *